July 21, 1931.  A. F. FOSTER  1,815,248

ATTACHMENT FOR SHEET MEASURING MACHINES

Filed July 25, 1930  2 Sheets-Sheet 1

INVENTOR:
ALBERT F. FOSTER.
BY
ATTORNEYS.

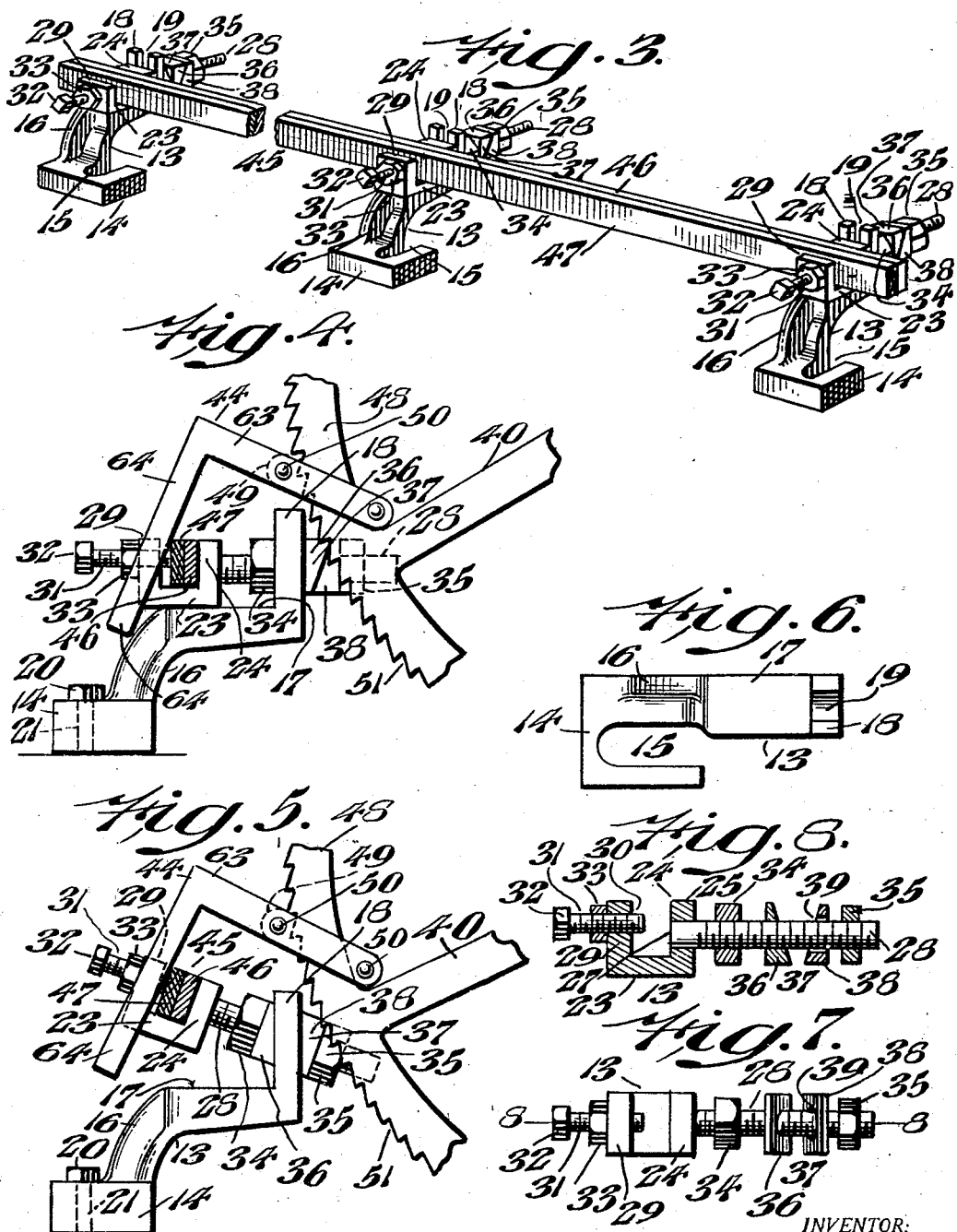

Patented July 21, 1931

1,815,248

UNITED STATES PATENT OFFICE

ALBERT F. FOSTER, OF PHILADELPHIA, PENNSYLVANIA, ASSIGNOR TO F. F. SLOCOMB & CO. INC., OF WILMINGTON, DELAWARE, A CORPORATION OF DELAWARE

ATTACHMENT FOR SHEET MEASURING MACHINES

Application filed July 25, 1930. Serial No. 470,719.

This invention in general relates to machines or devices for measuring the size or area and the thickness of sheet material such as a hide or skin, and more particularly to a novel attachment for a machine of the kind indicated, having for its principal object the provision of an inexpensive time and labor saving attachment for a sheet measuring device which will not only do away with the necessity of adjusting a multiplicity of individual elements hitherto essential, but also add substantially to the life of certain vital elements of the machine itself.

Another object is the provision of an attachment of comparatively simple design and construction which may be quickly applied to a sheet measuring machine and which will permit an indefinite number of adjustments to be made expeditiously and with the utmost ease.

A further object is to provide an attachment of the kind indicated that will permit the simultaneous adjustment of all the toothed or gear wheels of a sheet measuring machine by the adjustment of two or three of my attachments instead of the separate adjustment of the stop on each gear or toothed wheel hitherto required.

Other objects and advantages residing in the novel design, construction and arrangement of parts employed will appear hereinafter.

In the drawings:

Fig. 3 is a perspective view of the bumper rod of a sheet measuring machine showing my invention in operative position thereon;

Fig. 4 is an enlarged side elevational view of the invention illustrating one position thereof, certain portions of the sheet measuring machine being included in fragmentary elevation;

Fig. 5 is a view similar to Fig. 4 showing another position of my novel attachment;

Fig. 6 is a top plan view of the bracket which forms a support element for and a component part of my novel attachment;

Fig. 7 is a top plan view of the adjusting means which is supported on the bracket disclosed in Figs. 4 and 5; and Fig. 8 is a longitudinal section view taken on line 8—8 of Fig. 7.

Figure 1:
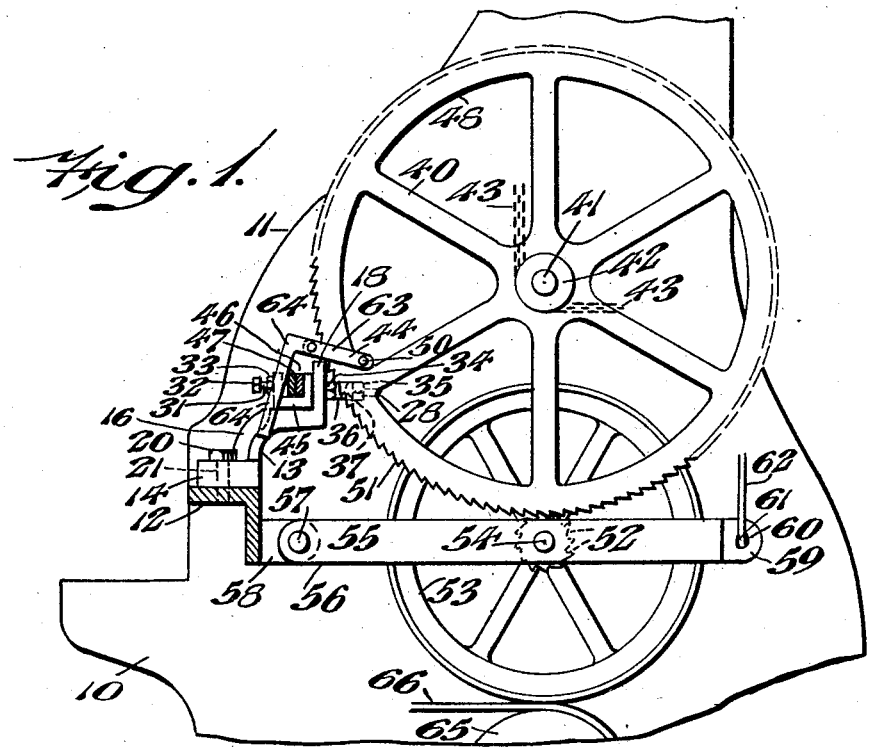
Fig. 1 is a fragmentary side elevational view of a sheet measuring machine to which my invention is operatively applied.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

The present embodiment of the invention is applied to sheet or leather measuring machines of the general type disclosed, for example, in the patent to Brophy, No. 1,638,913, dated August 16, 1927, for a machine for measuring sheet. As accuracy is absolutely imperative in such machines in indicating the different thicknesses, sizes and areas of various sheets of material, leather, etc., it is essential to provide means for taking up, compensating for, or rectifying any wear on those parts which are directly connected with the measuring or indicating functions of the machine. Such wear is most apt to occur in the toothed or gear wheel and the coacting pinion which revolves with the measuring wheel as the latter passes over the material between itself and a bed roll. Heretofore it was necessary to adjust each individual stop on each toothed or gear wheel which in a machine similar to that illustrated in the above mentioned Brophy patent would require forty separate stops to be detached and then reclamped in a new position on the rim of the toothed or gear wheel. This procedure, of course, entailed a considerable outlay of time, labor and expense, but was nevertheless required whenever one or more gear teeth of the said toothed or gear wheel became worn, mutilated or stripped, which of course required either the substitution of an entire new gear wheel or else the repositioning of the old wheel in order to bring new gear teeth into play. Both of these alternatives are now obviated by my invention since at the utmost only three or four of my novel attachments are required, each of which is adjusted with ease and dispatch with a pair of pincers or a small wrench.

In the drawings, wherein similar reference characters indicate corresponding parts in the preferred form of the invention, 10 designates one of the side frame-supporting members of a sheet measuring machine 11 whereon is mounted a shelf 12 of angle-iron construction which forms a support for the holder 13 forming a part of the present invention. The holder 13, as best shown in Figs. 4 to 6 inclusive, is composed of a casting having a base plate or lug 14 provided with a slot 15 and an upwardly projecting arcuate arm 16 having a shelf or platform 17 with which is formed integrally a vertically projecting element 18 formed with a slot 19. As clearly shown in Figs. 3, 4, and 5, the holder 13 is adjustably secured to the angle-iron shelf 12 by a bolt 20, the head of which is directly engaged on the upper portion of the base plate 14 while the stem 21 thereof is adjustably received in the slot 15, the threaded end of the bolt 20 being secured in holes 22 formed in the shelf 12.

As an important feature of the present invention, and a component part thereof, I detachably secure to the holder 13 a bumper rod adjusting member 23 which includes a U-shaped lug 24 in one arm 25 of which an end 27 of a threaded stem 28 is fixedly secured. The other arm 29 of the U-shaped member 23 has a hole 30 in which is rotatably engaged the threaded stem 31 of a bolt 32, the latter being adapted to be secured in the position desired by a lock nut 33.

By inspection of Fig. 8, it will be seen that a pair of nuts 34, 35 are engaged on the thread of the stem 28 while in addition a clamping member 36, forming an important feature of the present assembly, and consisting of a nut diagonally split into two coacting half-sections 37, 38 respectively is mounted on the stem 28. The half section 37 of the clamping member 36 is threadedly engaged on the stem 28 while the other half section 38 is freely slidable thereon, the central hole 39 in the last mentioned half section 38 being of a diameter sufficient to clear the threaded stem 28 for the purpose of free slippage thereon, as will hereinafter appear.

Figure 2:
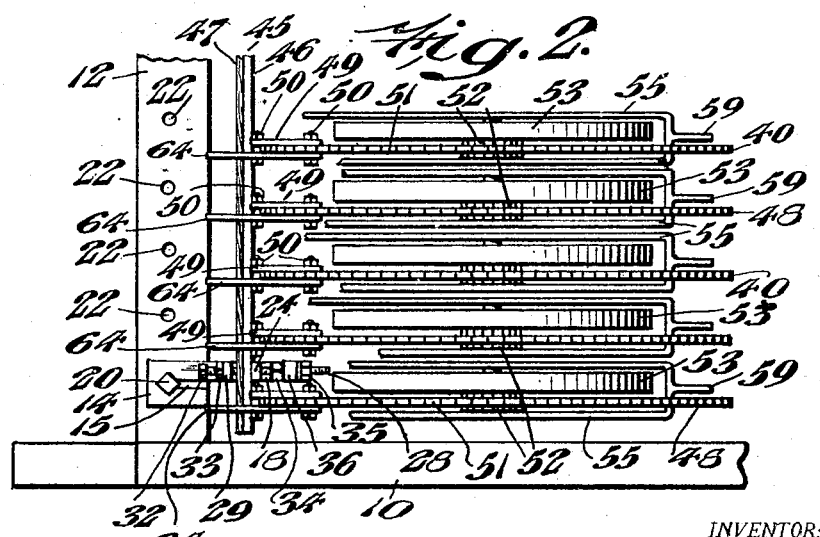
Fig. 2 is a fragmentary top plan view of a sheet measuring machine showing one of my attachments secured thereto.

As best shown in Fig. 1, it will be observed that the toothed or gear wheel 40 which forms a part of the sheet measuring machine 11 is rotatably mounted on a shaft 41 secured to and forming a part of the said sheet measuring machine. The gear wheel 40 has secured thereto a pulley or pinion 42 engaged by a chain, belt, or other flexible member 43 which is connected to instrumentalities (not shown) for denoting and indicating the thickness of various sheets of material, such as leather, etc. The gear wheel 40 also, as shown in Figs. 1 and 2, has secured thereto an adjustable stop and weight member 44 which engages a bumper rod 45 composed of a metal strip or rod 46 having a buffer strip 47 attached thereto. The adjustable stop and weight 44 is clamped to the rim 48 of the gear wheel 40, it being observed that rim 48 is secured between the stop and weight member 44 and a link 49 by bolts 50 threaded through member 44 and link 49. Since the construction and operation of sheet measuring machines of the type described and illustrated in the patent to Brophy et al., No. 1,638,913, of August 16, 1927, are well known in the art, it will not be necessary here to detail said machine further than to mention such parts as coact directly with the present attachment or are essential to a comprehension of its functions. The teeth 51 of the gear wheel 40 are engaged by the teeth of a pinion 52 secured to a measuring wheel 53 rotatable on an axle or pin 54 fastened in a yoke 55 rockingly mounted at one end 56 on a pin 57 fastened in an extension 58 of the angle iron shelf 12, the other end 59 of the yoke 55 having a hole 60 which receives the hooked end 61 of a link 62 connected to a counter-weight (not shown) of the toothed or gear wheel forming a part of the machine.

As illustrated in Fig. 1, the L-shaped stop and weight member which has one arm 63 clamped to the rim 48 of the gear wheel 40, has another arm 64 which directly abuts the bumper rod 45, or rather the buffer strip 47 thereon, when the said gear wheel 40 is returned to normal or zero position by the stop and weight member 44 after the device has accomplished its functions of indicating the dimensions of a sheet of material as alluded to above. This is accomplished as follows: A power driven bed wheel or roller 65 which forms a part of the machine 11 coacts with measuring wheel 53 in receiving a sheet of material 66 therebetween, as clearly shown in Fig. 1.

As the sheet of material 66, which may be leather, fabricated material, etc., is received between the said measuring wheel 53 and the bed roller 65, the pinion 52 will be raised with the measuring wheel 53, and its pin 54, into operative engagement with the gear wheel 40. The machine 11 in its normal operations will now indicate by various instrumentalities thereon (not shown) the dimension of the sheet of material passing through the machine. It is to be understood that while there is illustrated in Figs.

2 and 3 a single stop and weight member 44, a machine of the Brophy type may have forty or more gear wheels, each with an individual weight and stop element thereon. Regardless, however, of the number of gear wheels and stop and weight members thereon, only two or three of my novel attachments to be secured on the bumper rod 45 are required. In the present invention it will be seen at a glance that when the bumper rod 45 is adjusted as hereinafter described by two or three of my novel attachments, each stop and weight member 44 on its individual gear wheel 40 will be simultaneously checked in the new limiting position of the said bumper rod 45. In the normal operation of the machine 11, since all of the gear wheels 40 are brought into play, it will be evident that they will all receive practically the same wear and consequently when adjustment is required to take up for wear, each of the forty weight and stop members on their corresponding gear wheels, as shown in the Brophy patent above, will have to be adjusted to contact the common bumper rod in order to bring into play new teeth on the gear wheel. All the labor and time required in this lengthy operation, as pointed out above, will now be in great measure obviated, since it will only be necessary to re-position two or three of my novel attachments on the bumper rod 45, which may be done in a few minutes, after which the machine may be used until the gear teeth are again worn sufficiently to affect the accuracy of the machine.

The manner and number of ways in which my novel attachment can be adjusted is as follows:

As best shown in Figs. 3, 4, and 5, the bumper rod adjusting member 23, which forms an important part of my invention, is secured to the bumper rod 45, the latter being clamped between the arms 25, 29 of the U-shaped lug 24 by the bolt 32. One adjustment of the bumper rod 47 as disclosed in Figs. 3, 4, and 5, for example, in a horizontal plane may now be made by moving the holder 13 as a unit by loosening the bolt 20 and sliding to a variable degree the holder to the left or right, the stem 21 of the bolt 20 riding in the slot 15. This procedure will obviously alter the positions of the bumper rod relatively to the arm 64 of the stop and weight member 44, resulting in the checking of the gear wheels 40 at a different point.

A second adjustment, for example, which directly involves the bumper rod adjusting member 23 which forms the principal adjusting instrumentality may be made as follows: Assuming the stem 28 to be received in slot 19 and the vertically projecting portion 18 to be clamped (Fig. 4) between the nut 34 and a vertical side of the coacting half section 37 of the clamping member 36, by rotating the said nut 34, and half section 37, the stem 28 may be moved longitudinally, to the left or right as seen in the figure, which will also result in altering the horizontal position of the bumper rod 45 again checking the stop and weight member 44 in a new limiting position.

A third adjustment, for example, of the bumper rod 45 angularly may be made by means of the bumper rod adjusting member 23 as follows: When the stem 28 is supported in the slot or fork 19 of the vertically projecting portion 18, the said stem 28, as clearly shown in Fig. 5, and consequently the bumper rod 45 may be swung in diagonal or sloping relation relatively to the portion 18 and the horizontal plane of the machine 11. In this instance the portion 18 is clamped between the two diagonal faces of the inner sides of the half sections 37, 38, the slidable section 38 being locked by nut 35. The half section 37 may also be locked by nut 34.

A fourth adjustment may be made by raising the stem 28 and consequently the bumper rod adjusting member 23 in the vertical slot or fork 19 and then securing the member 23 by the nuts thereon.

The four adjustments herein described, it will be obvious, provide a considerable scope in the way of repositioning for the bumper rod 45 while obviating the necessity for the removal of all the stop and weight members 44 heretofore required. Both the holder 13 and the bumper rod adjusting member 23 are devices of the most simple and inexpensive construction, as is apparent, and they have been designed with a view to their almost immediate attachment to any machine of the general type shown in the Brophy patent above alluded to.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention, what I claim as new, and desire to secure by Letters Patent, is:

1. An attachment of the kind described for a sheet measuring machine including a bumper rod and a stop therefor, said attachment comprising a member detachably secured to the bumper rod for engagement with the stop, whereby said bumper rod may be laterally, vertically, or angularly adjusted.

2. An attachment of the kind described for a sheet measuring machine including a plurality of gear wheels having stops thereon coactingly engageable with a bumper rod forming a part of said machine, said attachment comprising a holder fastened to the bumper rod, said holder having secured thereto a bumper rod adjusting member, said bumper rod adjusting member having means thereon for moving the bumper rod of the machine in a vertical, angular, or horizontal plane.

3. An attachment of the kind described for a sheet measuring machine comprising in combination a holder longitudinally adjustable on an element forming a part of the sheet measuring machine, and a bumper rod adjusting member, said bumper rod adjusting member being longitudinally, vertically, or angularly adjustable upon said holder.

4. An attachment of the kind described comprising in combination a holder and a bumper rod adjusting member detachably and adjustably secured to said holder, said bumper rod adjusting member being secured to the bumper rod of a sheet measuring machine, and said holder being fastened to a component part of the machine.

5. A device of the kind described for a sheet measuring machine including a bumper rod and a combined stop and weight, said attachment comprising a holder detachably and adjustably secured to the frame of said sheet measuring machine, and a bumper rod adjusting member secured to said holder, said bumper rod adjusting member being clamped to the bumper rod of said machine and having a longitudinal, vertical, and angular adjustment upon said holder.

6. A device of the kind described comprising in combination with a sheet measuring machine and a combined weight and stop therefor, an attachment adjustably secured to the frame of said machine, said attachment including a holder adjustably fastened to the machine and having a slotted portion receiving a bumper rod adjusting member, said bumper rod adjusting member having an element fastened to the bumper rod of said machine, and means on said bumper rod adjusting member including a clamping member formed of a diagonally split nut for angling said bumper rod adjusting member and consequently the bumper rod of said machine laterally, vertically, and angularly.

7. An attachment of the kind described for a sheet measuring machine comprising a holder having a projecting portion, a bumper rod adjusting member secured to said projecting portion, a stem on said bumper rod adjusting member, a plurality of nuts on said stem, and a clamping member secured to the stem, said clamping member consisting of a nut split diagonally into two coacting sections, each of said sections having a sloping face for the securing of said projecting portion in order to position said stem at an angle.

8. A bumper rod adjusting member comprising a U-shaped lug, a pair of stems secured to said lug, one of said stems being adjustable relatively to the lug, the other of said stems being immovable thereon, a pair of nuts and a clamping member upon said last mentioned stem, said clamping member being formed of two coacting half sections each having a sloping portion, said sloping portions engaging a holder for the positioning of the last mentioned stem and consequently said bumper rod adjusting member in angular relation to a horizontal plane.

In testimony whereof, I have hereunto signed my name.

ALBERT F. FOSTER.